Dec. 13, 1960  S. BERNSTEIN  2,964,633
BACK SCATTER THICKNESS GAUGE
Filed July 30, 1956
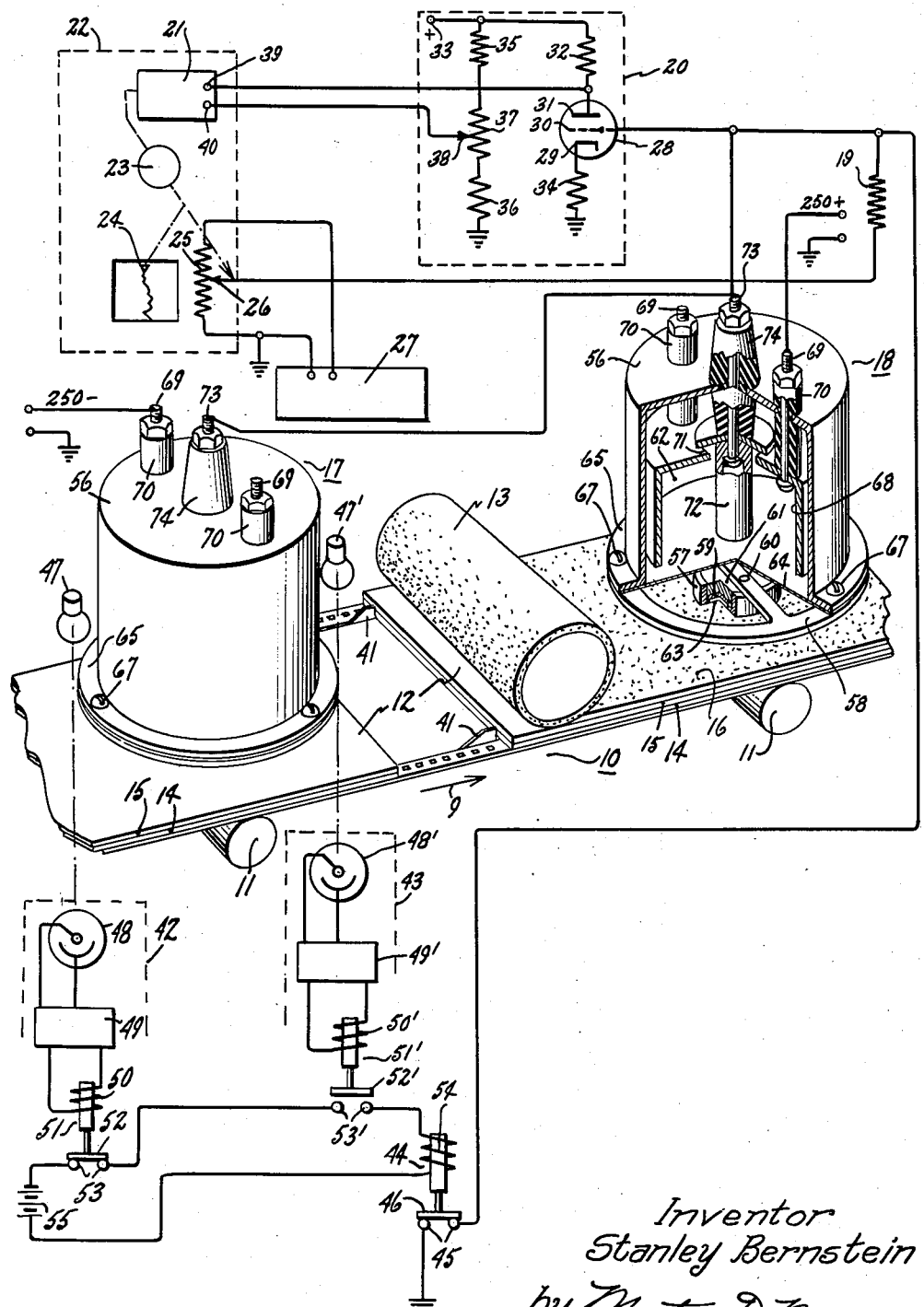
Inventor
Stanley Bernstein
by Merton D. Moore
His Attorney

United States Patent Office 2,964,633
Patented Dec. 13, 1960

2,964,633

BACK SCATTER THICKNESS GAUGE

Stanley Bernstein, Schenectady, N.Y., assignor to General Electric Company, a corporation of New York Filed July 30, 1956, Ser. No. 600,784

3 Claims. (Cl. 250—83.6)

This invention relates to the measurement of thickness of material by the radiation backscatter method. More particularly, this invention relates to the measurement of the thickness of a coating substance which is placed on a backing of one or more materials.

A particular application of the method and apparatus contemplated herein is the measurement of the thickness of lacquer on tinplate (a backing of steel coating with tin). For this particular application, it is desired to obtain a running measure of the thickness of the lacquer coating on strips of tinplate which are moving through rolls at a high rate of speed (up to 60 or 70 m.p.h.). As a consequence, it is desirable to monitor the thickness of the lacquer coating as it is applied. Since the lacquer coating is generally applied to strips of tinplate which are moving down a conveyor at a high rate of speed (60 to 70 m.p.h.) the thickness gage must be capable of measuring rapidly and accurately so that defects in the coating process may be corrected before too much tinplate has passed through the coating apparatus. It is obvious that faulty operation is extremely expensive. Various methods of monitoring the lacquer thickness have been contemplated and tried but none have proved entirely satisfactory.

Transmission thickness gages, such as X-ray thickness gages, have been unsuccessful in application of the type considered herein for the reason that the backing material affects the reading obtained to a much greater extent than the thickness of lacquer applied. Therefore, the effect of variations in lacquer thickness is masked out. The beta ray backscatter method of measuring thickness has been utilized for various applications and has even been utilized to measure the thickness of a coating on a backing of a given material (for example, see Steel Equipment and Maintenance News, May 1954, Unique Atom Powered Instrument Measures Zinc Coating Thickness). The effect of backscatter from backing or base material has given difficulty in obtaining accurate measurement of the thickness of the coating material. Also, the atmosphere between the backscatter measuring head and the material being measured, particularly in the throat of the head, affects the accuracy of measurements obtained. That is to say, the radiation received by the measuring heads and consequently the accuracy of the instruments are affected by temperature variations in the surrounding air and contaminants, such as solvents, in the atmosphere.

These difficulties have been overcome to some extent by utilizing a pair of backscatter measuring heads and directing one head at the coated material and the other head at a sample of the backing material which is of the average thickness of the backing of the strip to be measured. The output of the two heads are then subtracted to give a reading which is a measure of the thickness of the coating material on the backing. This type of application is illustrated and described in pages 107 through 113, inclusive, of the Conference of the Academy of Sciences of USSR on the Peaceful Uses of Atomic Energy, July 1 through 5, 1955, Session of the Division of Technical Science, English Translation USAEC, Washington 1956.

The latter backscatter thickness measuring method described above is the most promising of all the known approaches but in the case of tinplate suffers from the defect that variations in the thickness of the tin coating show up in the reading as variations in the thickness of the lacquer coating. The variations in the thickness of the tin may have a much greater effect on the backscatter than will variations in thickness of the lacquer and therefore this method of measuring lacquer thickness is ineffective for that particular application.

Accordingly, it is an object of this invention to provide a means to determine accurately the thickness of a coating substance on a base material where variations in thickness of the base material affect the reading.

A further object of this invention is to provide a means to determine accurately the thickness of a coating substance on a composite strip of two or more materials.

A still further object of this invention is to provide a backscatter thickness gage which will accurately determine the thickness of a coating material on a series of composite strips of two or more materials.

In accordance with the present invention, the thickness of a coating material on a backing is accurately obtained by providing two backscatter gage heads along the line of movement of the coated material. One of the gage heads observes the material before a coating is applied and the second gage head observes the material after the coating has been applied and the output of the two gage heads are subtracted so that the difference reading represents the thickness of the applied coating. This difference voltage is developed across an impedance, amplified, and a servo-system is utilized to drive a nulling device to buck out or null the difference voltage. The position of the nulling device then is a function of the potential difference developed and therefore it is also a function of coating thickness.

The novel features which are believed to be characteristic of this invention are set forth with particularity in the appended claims. The invention itself, however, both as to its organization and method of operation together with further objects and advantages thereof may best be understood by reference to the following description taken in conjunction with the accompanying drawing in which is illustrated a schematic diagram of the circuit elements employed and a perspective view of the mechanical system.

Referring specifically to the drawing, a roller conveyor 10 having rolls 11 is provided for conveying strips 12 of the material being coated and gaged in the direction indicated by the arrow 9. A cylindrical coating drum 13 is provided over the conveyor for laying a coating of lacquer on the strips of material 12. Since the particular application described is for measuring the lacquer thickness coating on tinplate, the strip of material 12 over the coating roll 13 is illustrated as having a steel base or backing material 14, a thickness of tinplate 15 on the steel backing and the portion of the strip which has already passed under the roll has a coat of lacquer 16 on the composite backing of steel and tin.

The gaging apparatus includes a pair of radiation type gage heads 17 and 18 above the strip of material and on either side of the coating roll 13. The two gage heads are preferably conventional beta ray backscatter type gage heads which direct beta rays toward the strip of material 12 and produce an electrical output which is a measure of the amount of radiation scattered in the material and returned outwardly therefrom. The gage heads and their operation are more fully described subsequently. Each strip of material passes first under the leading gage head 17 and then under the coating roll 13, and the trailing gage head 18. As a consequence, the leading gage head 17 is directed at a strip of material before a lacquer coating has been applied and the trailing gage heads observes the strip after the lacquer coating has been applied.

In order to utilize the electrical signals developed by the two gage heads, they are electrically connected in such a manner that their outputs subtract. This difference is developed as an error voltage or potential across a resistor 19 as is explained in connection with the detailed circuit description below. This error voltage is then amplified by means of a direct current amplifier 20, and supplied to a conventional servo amplifier 21 of a recorder 22. The recorder also includes a reversible motor 23, an indicator 24, and a slide wire potentiometer 25 having a sliding tap 26 thereon. The motor 23 is electrically connected to receive the output of servo amplifier 21 and mechanically connected to drive the recorder indicator 24 and the potentiometer tap 26. The slide wire potentiometer 25 is connected across a regulated power supply 27 in such a manner that the voltage developed across the lower end of the potentiometer (the portion tapped off by the tap 26) is of a polarity to oppose or block the voltage developed across the resistor 19.

A variation in lacquer thickness causes a change in the amount of radiation scattered in the coated material 12 and returned outwardly therefrom and consequently results in a change in potential across the resistor 19 by virtue of the circuitry explained below. This change in potential, in turn, causes an increase in output of the direct current amplifier 20 and the servo amplifier 21. Servo amplifier 21 energizes the motor 23 in such a manner that it drives the tap 26 on the slide wire potentiometer 25 until the voltage developed across the tapped portion of the slide wire resistor 25 nulls out the voltage developed across resistor 19. The motor 23 also drives the indicator 24 to a position which corresponds to the position of the tap 26. Since the tapped portion of the slide wire potentiometer 25 is dependent upon the voltage drop across resistor 19, the positions of the tap 26 and the indicator arm 24 are functions of the difference in potential across resistor 19 and, consequently, a function of the thickness of the lacquer coating 16.

Each of the gage heads 17 and 18 are identical, therefore only the trailing gage head 18 is broken away to show the component parts. As may be seen, the head consists of a main housing 56, which encloses an ionization chamber 62 and a source housing 57 fixed to the lower surface of the main housing by a spider 58. The source housing 57, as indicated by the name, contains a source of radiation, i.e., the source 59 of beta rays. The source housing 57 may be secured to the spider 58 by any conventional means such as the pins 60, which extend through the spider 58 into a thick back portion 61 of the source housing. The back portion 61 of the source housing 57 is of a material which acts as a shield to prevent the radiation source 59 from directly affecting the ion chamber 62 within the main housing 56. The front of the source housing 57 is also provided with a thin window 63 which will pass radiation from the source to the material under inspection. A flange 65 is provided around the lower end of the cylindrical main housing 56 so that bolts or screws 67 may be passed through the flange to hold a thin window 64 and the source supporting spider 58 in position and seal the main housing. Sealing the main housing 56 allows the density of air or gas in the chamber to be controlled to obtain stability. The thin window 64 allows radiation scattered from the material under inspection to enter chamber 62.

A substantially cup shaped outer electrode 68 is supported in its inverted position within the ionization chamber 62 by means of conducting bolts 69 which pass through the main housing 56 and which are insulated therefrom by means of insulators 70. The outer electrode 68 of the trailing gage head 18 is connected to a source of unidirectional voltage, which is positive with respect to ground, for example, +250 v. D.C. and the outer electrode 68 of the loading gage head 17 is connected to a source of direct voltage which is negative with respect to ground, for example, −250 v. D.C. These connections are made through the conducting and supporting bolts 69. In order to provide a space for a cylindrical shaped inner-electrode 72 to extend axially into the outer electrode 68, an aperture 71 is provided in the bottom of the cup shaped outer electrode 68. An electrical connection is brought out of the ionization chamber from the inner-electrode 72 by means of a conducting bolt 73 which supports the electrode 72. An insulator 74 is provided around the conducting and supporting bolt 73 to insulate the inner-electrode 72 from the main housing 56. The conducting bolt 73 of each gage head is then electrically connected to the grid 30 of the electrometer tube 28.

The ionization chambers 62 of the gage heads are essentially current devices since any radiation entering the chambers causes a current flow in the chamber between the outer and inner-electrodes 68 and 72 respectively. This occurs due to the potential difference which exists between the electrodes 68 and 72 causing the ionized particles to be collected by one of the electrodes. The direction of current flow, i.e., from the outer electrode 68 to the inner-electrode 72 or vice versa, is determined by which of the two electrodes is positive with respect to the other.

In order to develop a voltage which is a function of the current flow in the ionization chambers 62, the potential developing resistor 19 is connected between the center electrode 72 and ground. This circuit may be traced from the center electrode 72, through conducting bolts 73, resistor 19, and the lower or tapped portion of slide wire potentiometer 25 to ground potential. Since the outer electrode 68 of trailing gage head 18 is connected to a positive unidirectional potential source, ionization of the chamber 62 to this gage head (i.e., the reception of radiation in the chamber) causes current to flow through the series circuit of the potential developing resistor 19 just described from the source of positive potential to ground. That is, from the positive potential source through conducting bolt 69, outer electrode 68, chamber 62, inner-electrode 72, conducting bolt 73, potential developing resistor 19 and the lower portion of slide wire potentiometer 25 to ground.

Since the outer electrode of the leading gage head 17 is connected to a negative unidirectional voltage source, ionization of the chamber 62 in this head tends to cause current to flow through the potential developing resistor 19 in the opposite direction to that just described. This current flow may be traced from the ground connection at the lower end of slide wire potentiometer 25, the lower portion of this potentiometer, resistor 19, conducting bolt 73 of leading gage head 17, the inner-electrode 72, chamber 62, outer electrode 68 and conducting bolt 69 to the source of negative potential. Thus the differential preponderance of current developed by the gage heads 17 and 18 tends to flow through the potential developing resistor 19 and the lower portion of the slide wire potentiometer 25, and the difference potential developed across the resistor 19 is applied to the grid 30 of electrometer tube 28. The voltage applied across the slide wire potentiometer is of a polarity to oppose the voltage developed across the voltage developing resistor 19. As a consequence, a variation in lacquer thickness unbalances these two voltages and the electrometer tube amplifies the difference as has been previously described.

Because the currents from ionization chambers 17 and 18 are extremely small, a very large value of resistance is used for the resistor 19 (for example, $10^{12}$ ohms). This load is matched to the servo amplifier 21 by means of the electrometer amplifier 20 which is capable of operating with very large resistance in its input circuit. An electrometer tube 28 of conventional type such as the 5886 is used in the electrometer amplifier 20. The electrometer tube 28 consists of a cathode 29, a control grid 30 and an anode 31. The anode 31 and cathode 29, respectively, of the tube 28 are connected across a source of direct current potential with a plate resistor 32 connected between the plate and the positive terminal 33 of the direct current source and cathode resistor 34 connected between the cathode 29 and ground potential or negative terminal.

A voltage divider comprising a pair of resistors 35 and 36 and a slide wire potentiometer 37 with sliding tap 38 thereon is connected directly across the same direct current voltage source. The input terminals 39 and 40 of the servo amplifier 21 are then connected between the tap 38 of the voltage divider and the plate of the electrometer tube 28. In this manner the tap 38 may be adjusted on the voltage divider so that the voltage applied to the servo amplifier is zero when the voltage developed across resistor 19 (i.e., the difference output of gage heads 17 and 18) is equal to the voltage across the tapped portion 26 of potentiometer 25. As long as the thickness of the lacquer coating is the same the servo amplifier is not energized, therefore the motor 23 does not reposition tap 26 on the slide wire potentiometer 25. However, any change in the thickness of the lacquer coating will cause the system to operate as previously indicated to give an indication of the new thickness of the lacquer coat.

The servo amplifier 21 may be any one of a number of conventional servo amplifiers available on the market. For example, one which is satisfactory for this application is described and illustrated in the Minneapolis Honeywell Catalog 1521, pages 4 through 6, inclusive, copyright 1952–53, Minneapolis Honeywell Regulator Compan, Industrial Division, Philadelphia, Pennsylvania.

When the gage is used for measuring the thickness of a coating on a series of sheets of material 12 as illustrated, it will be apparent that the outputs of the gage heads 17 and 18 will vary drastically when they are not viewing a strip 12. That is to say, when either gage head is observing a blank space between strips, the voltage developed across the resistor 19 is of a different level from that which is developed when the heads are both looking at a strip of material. This difference in potential would normally cause a wide variation in the readings obtained by the gage and if the strips of material 12 are not very long and the speed of response of the circuitry is low, the system might never give the actual thickness reading desired. As a consequence, it is necessary to provide a blanking arrangement to take care of this occurrence. For the purpose of simplifying the blanking equipment, the strips 12 are spaced along the conveyor so that both of the gage heads 17 and 18 are observing a strip at the same time and are both observing a blank space between strips at the same time. This is accomplished by providing fingers 41 which extend upwardly at equal intervals along the conveyor 10 and engage the back edge of successive strips of material 12. The fingers 41 are driven by the conveyor drive (not shown) and push the strips 12 along the conveyor.

The blanking is accomplished by providing means to connect the grid 30 of the electrometer tube 28 to ground potential during the blanking period, i.e., when an open space between successive strips 12 are under the gage heads 17 and 18. This is effected by photoelectric relays 42 and 43 which control a relay 44 to short grid 30 to ground at desired intervals. The direct current amplifier 20 then acts as if there is no signal from the gage heads 17 and 18 and from feedback potentiometer 25 during such intervals.

The two photoelectric relays 42 and 43 control the condition (energized or not energized) of the shorting relay 44 which has terminals 45 connected between the grid 30 and ground potential and a contact member 46 adapted to bridge the terminals 45. The photoelectric relays 42 and 43 may be of any conventional type as described below, however, in the particular application illustrated and described herein the contacts of the relays are arranged to be open when a light falls on the phototubes 48 and 48'.

The blanking circuit acts as a leading and trailing edge detector by virtue of the physical relationship of the photoelectric relays with respect to the leading gage head 17 and the arrangement of the relay contacts. The leading photoelectric relay 42 is positioned just ahead of the leading gage head 17 so that it will sense the leading edge of a strip of material 12 as it passes under the leading gage head 17.

The photoelectric relay 42 consists of a light source, such as a lamp 47, which is positioned just ahead of the leading gage head 17 and above the conveyor 10, a phototube 48 positioned directly beneath the light source 47 and below the conveyor 10, and a conventional amplifier 49 connected to receive the output voltage of the photocell 48 and to supply energizing coil 50 of electromagnetic relay 51 which has a contact 52 and terminals 53. The amplifier 49 is provided to raise the output voltage of the photocell 48 to a level which will operate the electromagnetic relay 51. The contact member 52 is arranged so that it will bridge the relay terminals 53 when the photocell 48 does not receive light from the source 47 and will leave the terminals 53 open when light impinges on the photocell 48.

The trailing photoelectric relay 43 is identical to the leading photoelectric relay 42 and therefore corresponding elements are given corresponding reference numerals except that they are primed. Also, the trailing photoelectric relay 43 operates in exactly the same manner described with respect to the leading photoelectric relay.

In order to provide for the operation of the blanking relay 44 as previously described, the contacts 53 and 53' of the photoelectric relays are connected in series relationship with each other in the energizing circuit for the blanking relay 44, the blanking relay is energized only when neither of the photoelectric relays 42 and 43 receive light from their respective sources 47 and 47'. If either photoelectric relay receives light from its source, its contacts will be open and blanking relay 44 will not be energized, i.e., its bridging contact 46 will bridge its terminals 45.

In operation, then, if the apparatus is turned on and a first strip of material 12 is moving along the conveyor 10 in the direction indicated by the arrow 9, both photoelectric relays 42 and 43 will be energized and, consequently, the blanking circuit will be effective until the leading edge of the first strip of material 12 interrupts the light beam falling on the photocell 48 of the leading photoelectric relay 42. At this time the photoelectric relay 42 becomes de-energized (as illustrated) and its contact 52 bridges its terminals 53. The blanking relay 44, however, is not energized for the reason that the series of contacts 53' of the trailing photoelectric relay 43 are open. As the leading edge of the first strip of material 12 passes under the leading gage head 17 it intercepts the light source 47' of the trailing gage head 43 thus causing the contacts 53' to be bridged by the contact member 52', thus completing the circuit to energize the blanking relay 44. Blanking relay 44 is then energized and lifts its bridging contact 46 from the terminals 45 and allows the grid 30 of the electrometer tube 28 to be energized. It will be recognized that for this particular condition there is no strip of material under the trailing gage head 18 and therefore the reading obtained during this period is false, however, since there will be a strip under both gage heads while the circuit is in operation for all subsequent strips of material, the gage will settle down and give accurate readings. If desired, this defect may be eliminated by adding two more photoelectric relays to the system and positioning them in the same manner with respect to the trailing gage head 18 as occupied by the relays 42 and 43 with respect to the leading gage head 17. The contacts of these additional relays then, would be connected in series circuit relationship in the blanking circuit illustrated.

The strip of material 12 then passes under the coating roll 13 and receives a coating of lacquer and passes on under the trailing gage head 18 as another strip of material passes under the leading gage head 17. Thus, the leading gage head 17 is inspecting a strip of material which is not coated while the trailing gage 18 is inspecting a coated strip of identical material. The readings of the thickness of the coating is then obtained as has been previously described.

If desired, the recording motor 23 may also be de-energized during the blanking period by blanking relay 44. This may be accomplished by providing the relay 44 with another set of contacts (not shown) and connecting them in the energizing circuit of the recorder motor 23 in such a manner that they open this circuit when the grid 30 of the electrometer tube 28 is connected to ground.

While a particular embodiment of this invention has been shown it is to be understood that the invention is not limited thereto since many modifications both in the circuit arrangement and in the instrumentalities employed may be made. It is contemplated that the appended claims will cover any such modifications as fall within the true spirit and scope of the invention.

What I claim as new and desire to secure by Letters Patent of the United States is:

1. A backscatter radiation thickness gage for determining the thickness of a coating material applied to a moving strip of backing material, which backing material consists of at least two layers of material having different compositions, the thickness gage comprising a pair of backscatter radiation heads each including a source of radiation and detector means spaced along the same side of the strip of moving material, one of said heads positioned adjacent said strip before coating material is applied, the other one of said radiation heads being positioned adjacent said strip after the coating material is applied, said detector means being directly connected with each other in opposed polarity for developing a resultant current signal, and means for developing a voltage signal from said current signal corresponding with the thickness of the coating.

2. Apparatus for determining the thickness of a coating material on a backing material, which backing material consists of at least two layers of material having different compositions, the thickness gage comprising means for conveying a strip of the backing material along a given path at a given velocity, a first head positioned along the path near one side of the moving strip, and a second head positioned further along said path near the same side of said moving strip, a coating means for applying a coating material to said backing material positioned between said first and second heads, each of said heads having means for directing a beam of penetrating radiation into said strip and means for determining the amount of radiation scattered in the material and returned outwardly therefrom, said heads each having means for providing a signal responsive to the amount of radiation scattered in the material and returned outwardly thereof, means to directly determine the difference in said signals, and means responsive to said signal difference for indicating the corresponding thickness of said coating.

3. A backscatter radiation thickness gage for determining the thickness of a coating material applied to a series of spaced moving strips of backing material which backing material includes at least two layers of material having different compositions, said thickness gage comprising a pair of backscatter radiation heads spaced along the same side of the strips of moving material, one of said heads being positioned adjacent said strip before coating material is applied, the other one of said radiation heads being positioned adjacent said strips after the coating material is applied, means for directly subtracting the effect of the back scattered radiation on one head from the effect on the other, means to develop a voltage which is a function of the difference in the amount of radiation from each head scattered in the material and returned outwardly therefrom, means to prevent said voltage from being developed when either head is viewing a blank space between strips of moving material, servo means connected to be responsive to said difference voltage for developing an opposing voltage of equal magnitude, and measuring means responsive to said servo means to indicate the thickness of the coating material.

References Cited in the file of this patent

UNITED STATES PATENTS

| | | |
|---|---|---|
| 1,895,118 | Allen | Jan. 24, 1933 |
| 2,264,725 | Shoupp et al. | Dec. 2, 1941 |
| 2,667,583 | Herzog | Jan. 26, 1954 |
| 2,711,480 | Friedman | Jan. 21, 1955 |
| 2,763,790 | Ohmart | Sept. 18, 1956 |
| 2,769,098 | Dunham | Oct. 30, 1956 |
| 2,793,345 | Hags | May 21, 1957 |